United States Patent [19]
Moriyama et al.

[11] Patent Number: 4,731,680
[45] Date of Patent: Mar. 15, 1988

[54] DISK DRIVE WITH STORED POSITIONING DATA RELATED TO DISK EXPANSION

[75] Inventors: Masakatsu Moriyama; Keiichi Kaneko, both of Yokohama, Japan

[73] Assignee: Victor Company of Japan, Ltd., Japan

[21] Appl. No.: 943,751

[22] Filed: Dec. 19, 1986

[30] Foreign Application Priority Data

Dec. 19, 1985 [JP] Japan .................. 60-284428

[51] Int. Cl.$^4$ ................ G11B 21/08; G11B 21/10
[52] U.S. Cl. ........................ 360/78; 360/77; 318/634
[58] Field of Search .............. 360/77, 78, 75; 318/685, 696, 634, 632, 561; 364/170, 571

[56] References Cited

U.S. PATENT DOCUMENTS 4,122,503 10/1978 Allan ......................... 360/78

FOREIGN PATENT DOCUMENTS 60-140575 7/1985 Japan .

OTHER PUBLICATIONS

IBM TDB vol. 19, No. 3, "Track Location Correction Mechanism for Magnetic Disks", Hanson et al., 8/76, pp. 1039–1042.

"Refined Closed-Loop Servo Enhances Low-Cost Drive's Accuracy", by Larry Sarisky; Electronics/-Mar. 10, 1983, pp. 139–142.

Primary Examiner—Raymond F. Cardillo
Assistant Examiner—Steven R. Garland
Attorney, Agent, or Firm—Lowe, Price, LeBlanc, Becker & Shur

[57] ABSTRACT

A disk drive apparatus includes apparatus for elimination of off-track errors of a read/write head by deriving and storing correction data for all of the tracks on a disk on the basis of the signal level resulting from read-out of the contents of gap portions of the format data in two specific tracks. If, as indicated by a read error indication signal from a host computer, read errors subsequently occur in spite of position correction based on a stored correction value, then the off-track error for the track concerned is detected and an updated correction value is derived and stored. Accurate position control is thereby attained without a need for servo data tracks or regions to be recorded on each disk.

12 Claims, 6 Drawing Figures

DISK DRIVE WITH STORED POSITIONING DATA RELATED TO DISK EXPANSION

BACKGROUND OF THE INVENTION

The present invention relates to a disk drive apparatus for computer or other data processing applications, whereby automatic correction of off-track errors of a read/write head with respect to recording tracks formed on a surface of the disk is implemented, without the necessity to provide dedicated servo tracks or embedded servo data regions on the disk.

In recent years there has been a trend towards increasing the density of tracks which are provided on recording disks of the type generally referred to as "floppy disks". These are formed as flexible sheets and are used as an external recording medium for computers etc. To attain higher track densities, there is a requirement for an increase in the accuracy to which the read/write head (generally an electromagnetic head) used with such a disk will follow the recording tracks upon the disk, i.e. a requirement for elimination of off-track errors (that is, errors between the actual radial position of a read/write head and the optimum position of that head with respect to a track). Various tracking servo systems have been proposed in the prior art, for increasing this tracking accuracy. With one such system, outer and inner dedicated servo tracks are respectively provided around the outer periphery and inner periphery of the data tracks which are recorded on the disk, while in addition an optical scale is incorporated. The optical scale is used to accurately detect the position of the read/write head with respect to the reference tracks, whereby compensation is executed for any off-track error of the read/write head position.

With another known method employing inner and outer dedicated servo tracks, a stepper motor having a fine step adjustment capability is employed to move the read/write head. When a disk is newly set in the apparatus, the head is first moved into position over the outer servo track, and fine step adjustment is then performed to position the head directly over that track, by a servo positioning loop which functions on the basis of the amplitude of a signal which is read out from the head. The head is then moved to the inner servo track, and servo operation is again performed, to position the head directly over that track. The amount of fine adjustment of the head position which is required to align the head directly above the inner and outer servo tracks is thereafter utilized as data for determining amounts of fine adjustment which must be performed for each of the data tracks, to attain accurate head positioning for each track.

With another tracking servo method which is known in the prior art, a train of pulse signals are recorded as servo data in a predetermined region in each of the data tracks, i.e. as embedded servo data. The read signal level which results from reproduction of these pulse signals is compared with a reference level, whereby the amount of off-track error and the direction of that error can be detected. Compensation for this off-track error is performed by tracking servo operation.

With the prior art tracking servo arrangements describe above, it is necessary that dedicated servo tracks or embedded servo data regions be recorded beforehand upon each of the disks. This leads to increased manufacturing cost, and in addition such a method renders it impossible to utilize disks which do not have such dedicated servo tracks or embedded servo data regions recorded thereon. Furthermore, if such special disks are employed, then if the dedicated servo tracks or embedded servo data regions are inadvertently erased, tracking servo operation will no longer be possible.

Also, in the case of the second prior art method described above, continuous servo operation is not performed after the initial correction data has been obtained, based on the inner and outer servo tracks. Thus, any variation in recording track position which cannot be determined from that initial correction data (e.g. a shift in track position due to thermal expansion, for example) cannot be corrected with such a system.

Figure 2:
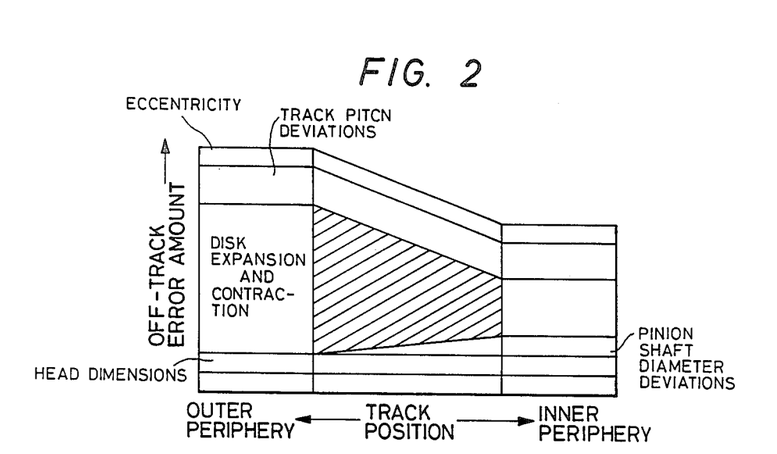
FIG. 2 is a diagram for graphically illustrating the relationship between radial position along a disk and the effects of various sources of off-track error.

The various sources and amounts of off-track error are graphically illustrated in FIG. 2. As shown, these include radial expansion and contraction of the disk due to changes in temperature or humidity, deviations in dimensions of different read/write heads (i.e. between different disk drive units), etc. However as can be understood from FIG. 2, the major source of off-track error is radial expansion and contraction of the disk, which can result in large amounts of off-track error along a direction extending from the inner periphery to the outer periphery of the disk recording area.

It can thus be understood that it is essential, for a disk drive apparatus providing a very high recording track density, to continuously monitor the position of the read/write head with respect to a track which is currently being accessed.

SUMMARY OF THE INVENTION

It is an objective of the present invention to overcome the problems of the prior art described above, and to provide a disk drive apparatus which does not require that any form of dedicated servo tracks or embedded servo data regions be recorded upon disks which are utilized by the apparatus, yet whereby a track density can be attained which has only been possible in the prior art by means of such dedicated servo tracks or embedded servo data regions utilized in conjunction with servo control systems for eliminating tracking errors.

To attain this objective, a disk drive apparatus according to the present invention includes means for measuring respective amounts of off-track error for each of two tracks which are respectively positioned at (or near) the inner and outer peripheries of the recording track area of a disk. These error amounts are then stored as correction values for these tracks, and are also employed in computing respective correction values for all of the other tracks. When a track is subsequently accessed, the position of the read/write head is correctly established on the basis of the corresponding correction value, thereby eliminating the off-track error for that track. Furthermore, if the host computer should detect the presence of read errors during read-out of data from a track, and issues a read error indication, then the system functions to derive an updated corrrection value for that track and to re-position the head in accordance with that updated value.

More specifically, a disk drive apparatus according to the present invention comprises:

a read and write head for writing and reading data to and from respective ones of a plurality of concentric track successively formed with a fixed track pitch on a surface of a recording disk, each of the tracks comprising format data which includes at least one gap portion having predetermined fixed data written therein;

a spindle motor for rotating the recording disk;

an access motor coupled to the read and write head for displacing the read and write head radially with respect to the recording disk above the recording disk surface;

detection means for detecting a level of a read signal produced by the read and write head during read-out of the data written in the gap portions, and for producing a detection signal representing the signal level, and;

computation and control circuit means including memory means, operable to execute a correction data acquisition operation by:

(a) controlling the access motor to move the read and write head to a predetermined standard position of a first track of a predetermined pair of the plurality of tracks, the pair being respectively positioned close to an outer periphery and close to an inner periphery of the plurality of tracks, and to then radially displace the read and write head relative to the standard position within a predetermined range of movement, the computation and control means then determining an amount of off-track error of the read and write head with respect to the standard position of the first track based upon changes in the detection signal occurring during the radial displacement of the read and write head with respect to the first track;

(b) controlling the access motor to move the read and write head to a predetermined standard position of a second one of the pair of tracks and to then radially displace the read and write head relative to the standard position within a predetermined range of movement, the computation and control means then determining an amount of off-track error of the read and write head with respect to the standard position of the second track based upon changes in the detection signal occurring during the radial displacement of the read and write head with respect to the second track, and;

(c) storing in the memory means the off-track error amounts for the pair of tracks as respective correction values, and computing respective correction values for each of the other ones of the plurality of tracks based upon the off-track error amounts determined for the first and second tracks;

the computation and control circuit means subsequently functioning to correctly position the read and write head in response to an externally supplied request for access to one of the tracks, by reading out from the memory means the one of the correction values corresponding to the requested track and then controlling the access motor to move the read and write head to a position which is radially displaced from the standard position of the requested track in a direction and by an amount which are in accordance with the corresponding correction value.

DESCRIPTION OF THE PREFERRED EMBODIMENTS

Figure 1:
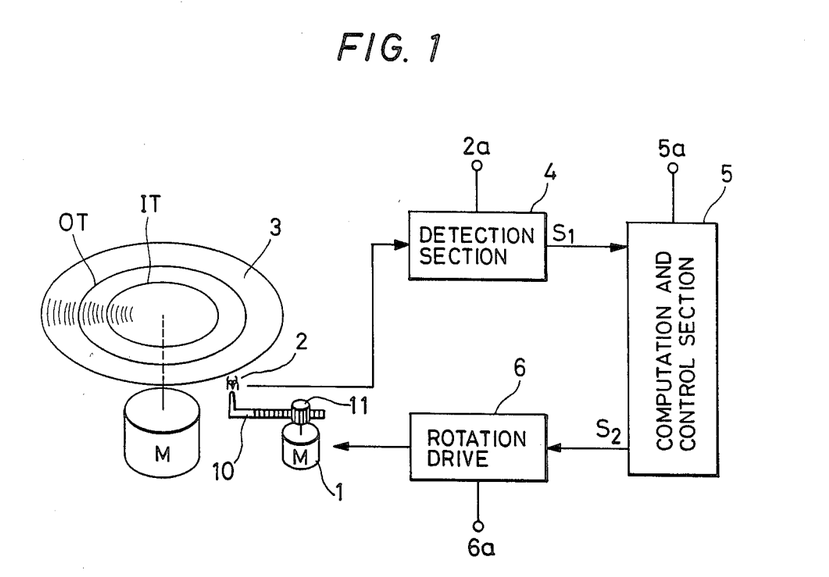
FIG. 1 is a general block diagram to illustrate the basic elements of a disk drive apparatus according to the present invention.

FIG. 1 is a simplified block diagram to illustrate the essential components of a disk drive apparatus according to the present invention. Numeral 1 denotes an access motor which is coupled by a rack 10 and pinion 11 to move a read/write head 2 along a radius of a disk 3, writing and reading signals to and from disk 3. Read and write data are transferred to and from a host computer (not shown) via a terminal 2a. Access motor 1 is a stepping motor which is capable of both normal stepping operation, (i.e. rotation in successive step rotation increments which by successive drive current polarity alternations) and microstepping operation. In the present specification and claims, "microstepping" has the significance of rotation in successive fine steps, i.e. "microsteps" each of which is substantially smaller than the step amplitude during normal stepping operation. Numeral 4 denotes a detection section, for detecting an amount of off-track error of read/write head 2 with respect to tracks which are formed on disk 3. This detection is performed on the basis of the amplitude of signals produced by read-out of a predetermined region of the format data, which is beforehand recorded upon such disks at standardized positions on each data track. The apparatus further includes a computation and control section 5, which functions to compute respective correction quantities for all of the tracks on disk 3 and to perform overall control functions. These correction quantities are based upon stored data obtained from output signals S1, which are produced from detection section 4 during a correction data acquisition operation which is executed when a disk is newly set into the apparatus. During this correction data acquisition operation, the read/write head 2 is moved to the approximate position of one of at least two tracks designated as OT and IT, which are formed on disk 3. Based on the amplitude of a signal which is read out of a format portion of this track, by the read/write head 2, the detection section 4 detects an amount and direction of positional error between the read/write head 2 and the selected OT or IT track, and produces signals S1 representing this error, which are applied to the computation and control section 5. The read/write head 2 is then moved to the approximate position of the other one of tracks OT and IT, and the above process is repeated. Based on the amounts of positional error which have thus been found for tracks OT and IT, the computation and control section 5 computes respective correction values for each of the other tracks on disk 3, and stores these values in predetermined addresses of a memory. The amounts of error found for tracks OT and IT represent, in themselves, the correction values for tracks OT and IT, and are stored accordingly.

It is an essential feature of the present invention that these two tracks OT and IT are exactly identical, in function and format, to all of the other data tracks on the disk. That is to say, the positions of tracks OT and IT are established, as are the positions of all of the other tracks, during initial formatting of the disk, i.e. the process of writing format data (described hereinafter) upon the disk, and tracks OT and IT can be utilized for writing and reading data in the same way as all of the other tracks on the disk. It is therefore not necessary to use dedicated servo tracks or embedded servo data regions in the tracks, so that an apparatus according to the present invention is completely compatible with disks which have been recorded on other types of disk drive apparatus which conform to the same disk format standards.

After initial correction data acquisition has been executed as described above, correction signals S2 are produced by the computation and control section 5 when a data track is accessed, with these signals S2 being generated in accordance with the stored correction quantitity for that track. These correction signals S2 are applied to a rotation control section 6, which controls the access motor 1. To access a desired track, data which identifies the required track is applied from the host computer, through an input terminal 6a, to the rotation control section 6. Rotation control section 6 then drives the access motor 1, by a specific number of steps, to a predetermined standard position of the required track. Microstep operation of access motor 1 is then executed by rotation control section 6, based upon the correction signals S2 produced from the computation and control section 5, to thereby precisely position the read/write head with respect to the track which is to be accessed.

It is another essential feature of the present invention that, thereafter, a form of position servo control operation is executed, to maintain the read/write head correctly aligned over the track which is being accessed. This servo control is based upon a "read error" indication signal, which is produced from the host computer in the event that errors are detected in the data which is read out from the track being accessed. This read error indication signal is applied from the host computer, to the computation and control section 5. In response, the computation and control section initiates a new correction date acquisition process, to obtain a new correction value which represents the actual amount of positional error between the read/write head and the track which is being accessed. This correction value is then stored, replacing the previously stored correction value for that track, and the computation and control section 5 produces a correction signal S2 in accordance with the new correction quantity, which causes the rotation control section 5 to position the read/write head precisely with respect to the track which is being accessed.

It can thus be understood that, with the present invention, error-free operation will be maintained in spite of the effects of expansion or contraction of the disk, but that it is not necessary to employ dedicated servo control tracks or embedded servo data regions to ensure such error-free operation. In this way, off-track error amounts can be held to extremely low levels, so that track density and hence recording density can be substantially increased, while maintaining complete compatibility with disks recorded on other types of apparatus.

Figure 3:
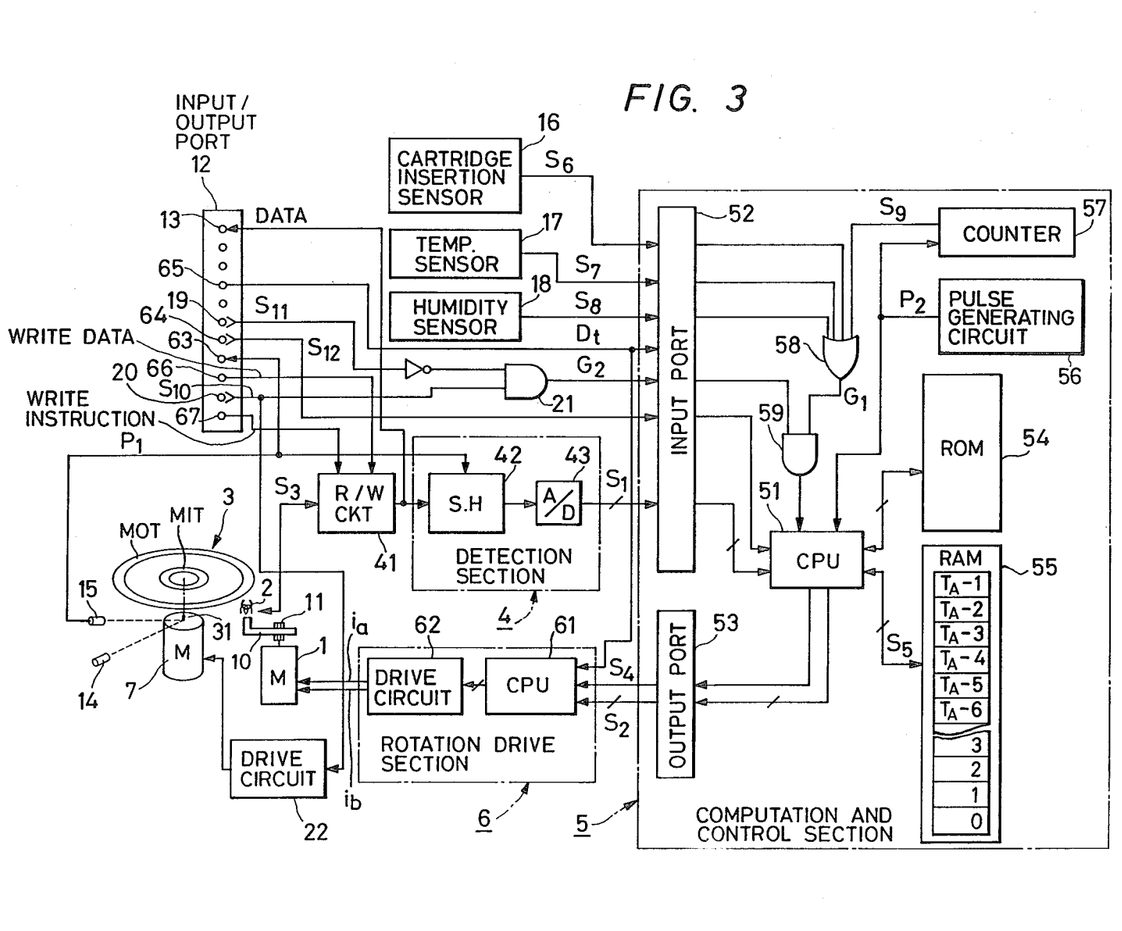
FIG. 3 is a block circuit diagram of an embodiment of a disk drive apparatus according to the present invention.

A detailed description of an embodiment of a disk drive apparatus according to the present invention will now be given. FIG. 3 is a block diagram of this embodiment, in which signals are transferred between the disk drive apparatus and the host computer through a port 12. The computation and control section 5 consists of an input port 52, an output port 53, a CPU (central processing unit) 51, a counter circuit 57, a pulse generating circuit 56, a ROM (read-only memory) 54, and a RAM (random access memory) 55. MOT denotes a track which is formed at the outermost periphery of the recording area of a disk 3 which is rotated by a spindle motor 7, while MIT denotes a track formed at the innermost periphery of that recording area. As stated above with reference to FIG. 1, these tracks MOT and MIT are in all respects identical in format to all of the other tracks on the disk, and are used for normal data read/write purposes. Respective amounts of off-track error of the read/write head 2 with respect the MOT and MIT tracks are detected by detection section 4, in accordance with the amplitude of a format data read signal, as described hereinafter. These amounts of off-track error represent values of correction which must be applied to the radial position of the read/write head 2 in order to align the head optimally with respect to the MOT and MIT tracks respectively, and are stored in RAM 55 of computation and control section 5. In addition, based on these off-track error quantities detected for the MIT and MOT tracks, respective correction values for each of the other tracks on disk 3 are computed by the computation and control section 5, and stored in RAM 55. These stored correction values will be collectively referred to as $H_N$. This completes a correction data acquisition process, which is executed when a disk 3 is set on the disk drive apparatus, during a time in which the disk is rotating but is not currently being accessed by the host computer.

Subsequently, when a track on the disk 3 is to be accessed, data designating the required track (indicated as $D_t$ in FIG. 3) is supplied from the host computer to the computation and control section 5 and the rotation drive section 6. The rotation drive section 6 then controls stepping operation of access motor 1 to move the read/write head 2 to a predetermined standard position of the required track. The correction value corresponding to that track is then supplied from the computation and control section 5 to the rotation drive section 6, which responds by controlling access motor 1 to execute microstepping operation in accordance with the correction value, whereby the read/write head 2 becomes positioned optimally with respect to the desired track.

The above positioning operations are performed prior to the time at which data transfer between the host computer and the read/write head 2 commences. Subsequently, after this data transfer has commenced, it is possible that off-track errors may occur during access to the selected track, in spite of the position correction operation described above. Such errors can arise for example due to thermal expansion or contraction of the disk. An off-track error will be detected by the host computer during read-out of data from the disk 3, based on the contents of the read data, and a read error indication signal will be generated by the host computer, which is supplied to the computation and control section 5. The computation and control section 5 responds by executing an internally stored program, whereby microstepping advancement of the read/write head 2 is performed across the position of the track in question. An off-track error quantity for that track is thereby determined by the error detection section 4, and is stored as an updated correction value for that track, replacing the previously derived correction value. The read/write head 2 is then repositioned above the required track, microstep adjustment of the head position is executed based on the updated correction value, and accessing of the track by the host computer is recommenced.

In this way, correction is applied to compensate for any special source of error which may affect particular tracks on the disk.

During normal stepping operation, the rotation drive section 6 preferably controls the access motor 1 to move the electromagnetic head 2 along a radius of disk 3 in steps which each have an amplitude equal to one track pitch, or in steps which each have an amplitude equal to a plurality of track pitches.

Furthermore, the disk 3 is preferably formed with a surface consisting of, for example, PET (polyethylene terethalate) which is coated with Fe powder, to thereby constitute a high-density recording medium. The overall diameter of the disk 3 in this embodiment is approximately 88.6 mm, and the total number of tracks formed on the disk is 160, so that the track density is 270.933 tpi.

Figure 4:
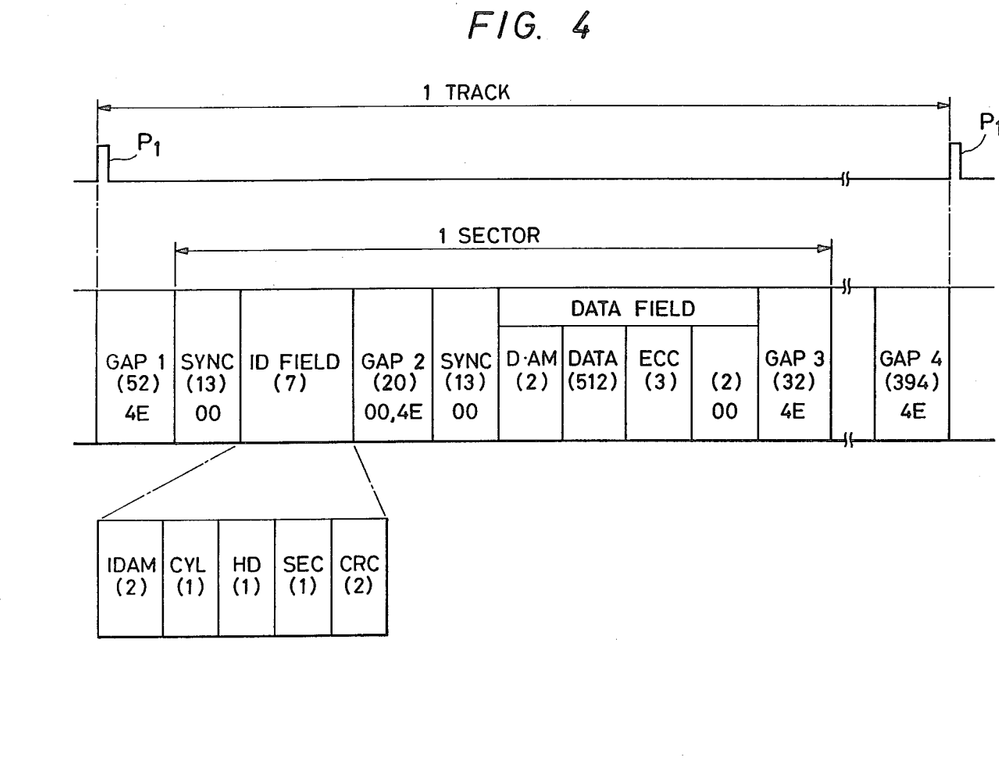
FIG. 4 is a diagram illustrating the signal recording format of a disk for use with the embodiment of FIG. 3.

FIG. 4 is a diagram to illustrate the format in which signals are recorded on disk 3. Each track is divided into 47 sectors, with these sectors extending between gap portions designated as GAP 1 and GAP 4. As used in the present specification and claims, the term "gap portion" has the meaning of a portion of a track within which is recorded a predetermined fixed pulse sequence, and which serves as a buffer region between data recording regions. Each sector has the configuration shown in FIG. 4, consisting of two synchronization signal portions (SYNC), an identification field ID, gaps GAP 2 and GAP 3, and a data field (DATA). The ID field consists of an ID address (IDAM), a cylinder number (CYL), a head number (HD), an error correction code (CRC), and a sector number (SEC). In FIG. 4, the numbers enclosed in parentheses indicate the number of bytes recorded in each field. The various portions shown in FIG. 4, except for the data field, are recorded on formatting.

The disk 3 is rotated by a spindle motor 7 at a relatively high speed of rotation (e.g. 1200 rpm).

Linear displacement of the electromagnetic head 2 is achieved by a drive force which is applied from the access motor 1, acting through a rack 10 and a pinion 11, whereby electromagnetic head 2 is moved radially across the disk 3.

Readout and write-in of signals from/to disk 3 are performed by data transfer between the host computer and electromagnetic head 2 through a data signal I/O terminal 13 of an input/output port 12. The data is transferred to/from the host computer via a controller (not shown in the drawings).

A read output signal S3 produced by the electromagnetic head 2 is supplied via a read/write circuit 41 to the detection section 4, which consists of a sample-and-hold circuit 42, and an A/D (analog-to-digital) converter 43. The read output signal S3 is amplified by amplifier 41, and the output signal thus produced is supplied to terminal 13 of port 12 and also to the sample-and-hold circuit 42. The sample-and-hold circuit 42 is coupled to receive index pulses P1 as hold pulses. These index pulses P1 are respectively produced in synchronism with successive revolutions of the disk 3, and have a timing relationship to the format data on the disk as shown in FIG. 4. The pulses P1 are generated in this embodiment through detection performed by a photo-coupler (formed of a light-emitting element 14 and a photo-sensing element 15) of light which is reflected from a reflector member 31, mounted on the shaft of spindle motor 7. The relative positions of the photo-coupler and reflector 31 are established such that each pulse P1 is generated at the commencement of read-out of the GAP 1 portion of the track which is currently being read (as shown in FIG. 4). The GAP 1 portion contains 52 bytes, consisting of repetitions of the hexadecimal number $[4E]_{16}$. In this way, the sample-and-hold circuit 42 performs hold operations in synchronization with output from read/write head 2 of a pulse train signal resulting from reading the successive $[4E]_{16}$ hexadecimal numbers from GAP 1. The resultant output signal from sample-the signal read out during sampling, is supplied to the A/D converter 43.

The index pulses P1 are also supplied via a signal input/output terminal 63 of the input/output port 12 to the controller of the host computer(not shown in the drawings), and the timing of these index pulses P1 serves to determine the timings at which the signals shown in FIG. 4 are recorded on the disk.

The A/D converter 43 supplies a sensing output signal S1 from detection section 4 to the computation and control section 5. Signal S1 is a digital signal, which represents the amplitude of pulses in the signal which is read from the GAP 1 track portion.

Figure 5:
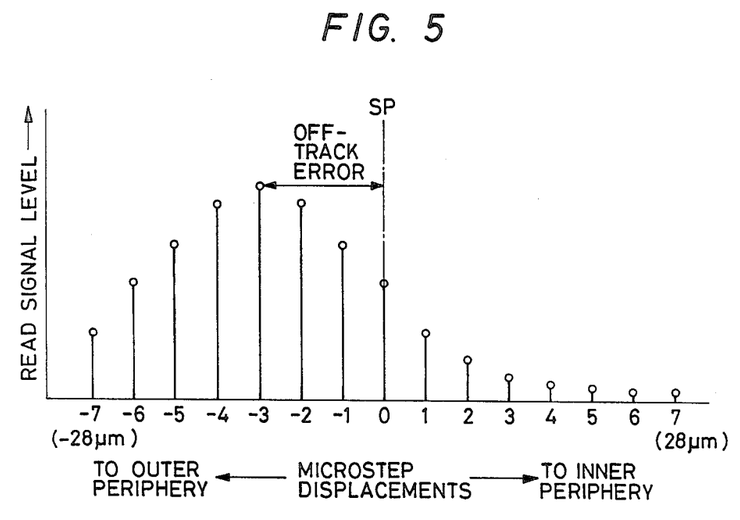
FIG. 5 is a diagram illustrating a relationship between microstepping displacement of a read/write head in the embodiment of FIG. 3 and read signal level output from the head.

Fine adjustment of the radial position of the electromagnetic head 2 is performed by microstepping operation executed by access motor 1 under the control of rotation drive section 6. This microstepping operation is illustrated in FIG. 5, in which an example of the read signal level represented by signal S1 from A/D converter 43 is plotted along the vertical axis, and corresponding microstep displacement of the read/write head 2 is plotted along the horizontal axis. Signal S1 varies successively in value as the electromagnetic head 2 is displaced by microstep adjustment from a standard position SP of an adjustment from a standard position SP of a track, and attains a maximum value when the head 2 is optimally positioned with respect to the target track, i.e. when the off-track error is a minimum. The standard position SP is an assumed position at which the head 2 should be correctly positioned with respect to a track, in the absence of off-track errors. In the preferred embodiment, the rotation drive section 6 consists of a CPU (central processing unit) 61, and a drive circuit 62. During a correction data acquisition operation, the CPU 61 causes the drive circuit 62 to supply successively different predetermined levels of drive current to the windings of access motor 1. Initiation of such an operation is designated by a command signal S4 which is supplied to the CPU 61 from a CPU 51 within the computation and control section 5 (described hereinafter), and in response to these successively varying levels of drive current applied to access motor 1, the electromagnetic head 2 executes microstepping operation radially across disk 3 through 15 microsteps. Preferably, head 2 is successively stepped radially in one direction away from position SP as a starting position, through 7 microsteps, then is returned to position SP and is stepped radially in the opposite direction through 7 microsteps. At each of these radial microstep positions, sampling of the read-out signal S3 from head 2 is performed at the timing of a P1 index pulse by sample-and-hold circuit 42, to thereby obtain a digital output signal S1 from A/D converter 43 which represents the amplitude of the sampled read signal pulses. The microstep position at which the maximum amplitude of signal S1 is obtained is the optimum radial position of the head 2 with respect to the track in question, and the difference (i.e. number of microsteps) between that position and the standard position SP is the amount of off-track error. It can thus be understood that this amount of off-track error, since it represents a number of microsteps and a direction by which the head 2 must be moved radially from position SP to attain the correct on-track position, constitutes a correction value for the track in question. In the example shown in FIG. 5, this correction value corresponds to movement of head 2 by 3 microsteps, in the radially outward direction.

It has found that this sampling operation is preferably performed a plurality of times for each of the microstep positions, and an average value for signal S1 thereby obtained for each of these positions, to achieve increased accuracy for signal S1.

The successive values of sensing output signal S1, obtained for each of the microstep positions as described above, are supplied from the detection section 4 through input port 52 of the computation and control section 5 to the CPU 51. Based on a program which is stored in the ROM 54, the CPU 51 determines the maximum amplitude of the sensing signal S1, and thereby derives a correction value for the track in question. This correction value is then stored in a location corresponding to that track, in RAM 55.

Thus to execute a correction data acquisition operation, the computation and control section 5 first issues a command signal S4 through output port 53 to a CPU 61 in the rotation drive section 6. CPU 61 responds by causing a drive circuit 62 to drive the access motor 1 to move the head 2 to the approximate position (i.e. the standard position SP as described above) of the outer peripheral track MOT. The correction value for track MOT is then derived as described above, and stored in a predetermined address of RAM 55. The head 2 is then moved to the reference position of track MIT, and the above process repeated to derive and store a corresponding correction value for that track.

The CPU 51 then computes optimum correction values for each of the tracks on the disk which lie between track MIT, with these correction values being computed based upon the correction values (i.e. amounts of off-track error) obtained for tracks MIT and MOT as described above. Computation of the optimum correction values $H_N$ is performed using the following formula:

$$H_N = H_{MOT} + \frac{N \times (H_{MIT} - H_{MOT})}{T_A - 1}$$

Where N is the track number (designating the outermost track MOT as having a track number of 0, the next radially inward track as having a track number of 1, and so on successively), $H_N$ is the correction value for the Nth numbered track, $T_A$ is the total number of tracks, $H_{MOT}$ is the off-track error amount for the outer peripheral track MOT, $H_{MIT}$ is the off-track error amount for the inner peripheral track MIT. These correction values $H_N$ are stored in predetermined respective addresses of RAM 55.

Subsequently, when access to a particular track is commanded by the host computer, data (indicated in FIG. 3 as $D_t$) which specifies the required track is supplied from the host computer, through port 12, to the CPU 51 of computation and control section 5 (via input port 52) and to the CPU 61 of rotation drive section 6.

The rotation drive section 6 responds by driving the access motor 1 to move head 2 to the standard position SP of the required track, by normal stepping operation. Based on the input track data $D_t$, CPU 51 of computation and control section 5 then transfers the correction value for that track into CPU 61 of the rotation drive section, as signal S2, and CPU 61 controls drive circuit 62 to produce microstepping operation by access motor 1, by an amount and in a direction which is determined by the correction value. The off-track error in position of head 2 is thereby corrected, so that head 2 is positioned accurately above the track which is to be accessed.

The maximum range of movement of head 2 which can be produced by such microstepping operation need only be extremely small. In the example of FIG. 5, this range is only ±28 microns, i.e. each microstep is equal to 4 microns of radial head movement.

In this way, the electromagnetic head 2 is positioned accurately over a specific track and will thereby precisely follow that track as the disk rotates.

If however the electromagnetic head 2 should thereafter enter an off-track error condition during read-out of data from the aforementioned track to the host computer, in spite of the correction which has been applied as described above, then a signal S12 indicating that a read error has occurred will be generated by the host computer. Signal S12 is transferred through I/O port 12 and input port 52 to CPU 51 in computation and control section 5. In response to signal S12, CPU 51 initiates operation in accordance with a program which is stored in ROM 54, whereby the off-track error amount for the track in question is measured and stored in the address of RAM 55 corresponding to that track, as a new correction value for the track (replacing the previously computed correction value for the track in question). The derivation of such an off-track error amount is performed in the same way as described hereinabove with reference to tracks MOT and MIT. Upon completion of acquisition of an updated correction value in this way, the track is again accessed by the host computer, with the head now accurately positioned with respect to the track.

In this way, the electromagnetic head 2 is held accurately on-track for all of the tracks, by a form of continuously operating servo control, which utilizes the read error detection capability that is a standard function of computers which utilize such a disk drive apparatus.

With the preferred embodiment, a cartridge insertion sensor 16, a temperature sensor 17, a humidity sensor 18 and counter 57 are also incorporated. When disk 3 (which forms part of a cartridge) is inserted into the disk drive apparatus, the insertion is detected by cartridge insertion sensor 16, which then produces a sensor output signal S6. The temperature sensor 17 detects variations in temperature within the disk drive apparatus, and produces a sensor output signal S7 when a change in temperature occurs which exceeds a predetermined amount. Similarly, the humidity sensor 18 detects variations in humidity within the disk drive apparatus, and produces a sensor output signal S8 when a change in humidity occurs which is greater than a predetermined amount.

The counter 57 counts clock pulses P2 of fixed frequency, which are supplied from pulse generator 56. When a predetermined number of pulses have been counted, i.e. each time a predetermined time interval has elapsed, counter 57 generates a counter output signal S9.

The output signals S6, S7 and S8 from sensors 16, 17 and 18 are supplied through the input port 52 of computation and control section 5 to the OR gate 58. The counter output signal S9 is also applied to an input of OR gate 58. Thus, each time that the predetermined time interval has elapsed, or whenever disk 3 is inserted into the apparatus, or when a change occurs in the temperature or humidity within the disk drive apparatus which exceeds a predetermined amount, then a gate output signal G1 is produced from OR gate 58 and is transferred through AND gate 59 to the CPU 51, if AND gate 59 is enabled at that time (as described hereinafter). In response to this gate output signal G1, CPU 51 supplies the command signal S4 to CPU 61 of the rotation drive section 6. A correction data acquisition operation is then initiated, i.e. the off-track error quantities of the outer peripheral track MOT and inner peripheral track MIT are again detected, as described hereinabove. The computation and control section then once more computes a new set of correction values $H_N$ for all of the tracks of disk 3, based on the off-track error quantities for the MOT and MIT, and stores these correction values in the respective addresses of RAM 55, in place of the previously derived correction values.

In this way, RAM 55 always has stored therein a set of correction values $H_N$ which are optimized with regard to elapsed time and to temperature and humidity changes.

In addition to the gate output signal G1, AND gate 59 also receives as input a gate output signal G2 produced from AND gate 21, i.e. transfer of an output signal from OR gate 58 through AND gate 59 is controlled by signal G2. An AND gate 21 receives as inputs a spindle motor drive signal S10 and the inverse of a selection signal S11. These signals S10 and S11 are supplied through terminals 20 and 19 respectively of input/output port 12 of the disk drive apparatus. The spindle motor drive signal S10, supplied from the host computer, is applied through drive circuit 22 as a command signal to designate rotation of the spindle motor 7. The selection signal S11 is a command signal which designates whether or not the host computer has selected this disk drive apparatus.

Thus, detection of the off-track error quantities and computation of the respective correction values $H_N$ for the various tracks is only performed while the following conditions are satisfied:

(a) the disk 3 is being rotated and, (b) the disk drive apparatus (of FIG. 3) is not currently selected by the host computer for write-in or read-out of data.

Figure 6:
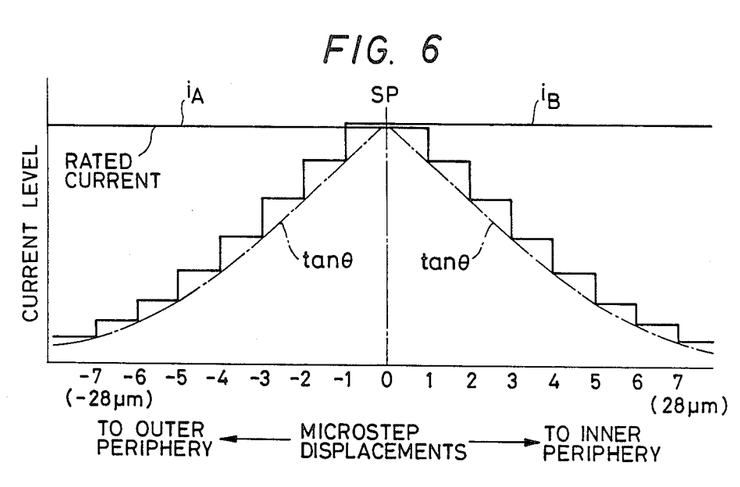
FIG. 6 is a diagram illustrating a relationship between microstepping displacement and drive current levels of an access motor in the embodiment of FIG. 3.

In the present embodiment, the rotation drive section 6 supplies 2-phase drive currents to the access motor 1. Normal stepping operation is executed by successive alternations in polarity of the drive current phases, as is well-known practice. During microstepping operation, the polarities of the drive current phases are held unchanged, but one current phase is varied in (absolute) amplitude relative to the other. The preferred waveforms for these drive current phases are as shown in FIG. 6, which shows the variations in the absolute amplitude of the two drive current phases (designated as $i_a$ and $i_b$ respectively) which are required in order to execute the microstepping operations shown in FIG. 5. As in FIG. 5, "SP" indicates the condition at which the read/write head 2 is set at the standard position relative to a track. In this condition, both of the drive current phases are at the rated level thereof. To execute microstepping in the radially outward direction, current phase $i_a$ is held constant, while the amplitude of current phase $i_b$ is successively reduced in a series of steps, which respectively decrease in magnitude in accordance with a tangent curve as shown. Similarly, to execute microstepping in the radially inward direction, current phase $i_b$ is held constant, while current phase $i_a$ is successively reduced in a series of steps, which respectively decrease in magnitude in accordance with a tangent curve.

Such a drive method has the advantage that the total drive current level which is supplied to the access motor 1 when the read/write head is set to the standard position of a track (before microstepping operation is initiated) can be fixed as the rated current of the stepping motor. This current level ensures that the maximum level of holding torque will be applied to the motor shaft, upon completion of a step rotation, and thereby ensures rapid attainment of a stable status of access motor 1 before a transition to microstepping operation is initiated following completion of one or more stepping operations.

With the prior art method of executing microstepping operation of such a stepping motor, on the other hand, it is necessary that the amplitude of one drive current phase, at an extremity of the range of microstepping operation, be substantially higher than the (common) amplitude of the two drive current phases at the center of that range (i.e. the current level at which stepping operation between successive tracks is performed). Specifically, microstepping operation is executed by stepwise increments of on drive current phase and simultaneous stepwise decrements of the other phase, with the successive steps for one phase following a sine curve and the successive steps for the other phase following a cosine curve. As a result, it is necessary that the drive current amplitude applied at the center of the microstepping range be approximately $1/\sqrt{2}$ times the amplitude of the amplitude of one of the current phases at an extremity of the microstepping range. Thus, it is necessary to either:

(a) make the the drive current amplitude of both of the current phases at the center of that range equal to $1\sqrt{2}$ times the rated current (rather than equal to the rated current, as in the example of FIG. 6), or:

(b) make the amplitude of one of the drive current phases substantially higher than the rated current level, at an extremity of the microstepping range (e.g. the 7th or −7th step in FIG. 6).

Either of these two alternatives has serious disadvantages, so that the novel method proposed by the applicant and described above with reference to FIG. 6 is highly advantageous, for attaining stable high-speed stepping and microstepping movement of a read/write head to thereby ensure an overall high speed of operation.

With the present invention, microstepping of the electromagnetic head 2 by the drive current phases $i_A$ and $i_B$ is always performed from the standard position SP as a starting point. Due to this, the same drive method is employed during microstepping which is performed during detection of the off-track error and microstepping operation performed (to execute position error correction) after access to a track has been initiated. This serves to minimize the amount of hysteresis of the position at which the electromagnetic head 2 is finally halted following access, and thereby ensures maximum positioning accuracy.

It can be understood from the above that a disk drive apparatus according to the present invention enables a read/write head to be maintained correctly positioned with respect to a disk track, without the necessity to provide dedicated servo tracks or embedded servo data regions on the disk, since data indicating an amount of off-track error is derived by read-out of a "gap", i.e. buffer portion of standard format data, which is routinely recorded on every track of a disk. Furthermore, continous monitoring of the amount of off-track error while data is being read out from the disk to a host computer is executed on the basis of read error detection which is performed by the host computer itself. In this way, a form of continuous servo control of the off-track error is implemented.

It has been found that by employing a disk drive apparatus having the configuration described above it is possible to increase the maximum track density of a 3.5 inch disk from approximately 160 tpi (tracks per inch) to approximately 270 tpi.

In the preferred embodiment, the detection output signal S1 is derived by sampling the output signal from head 2 resulting from reading the contents of the GAP 4 portion of the format data. This is the longest of the gap regions in the format data, and hence this method enables stable detection output to be obtained. However it should be noted that the present invention is not limited to use of that format data portion, and that it is possible to also perform sampling of signals resulting from read-out of the GAP 2 or GAP 3 portions of the format data, in which the same $[4E]_{16}$ data is repetitively recorded as in GAP 4. If this is done, then correction values can be obtained for each track at several positions along the track, whereby more accurate values of correction data can be obtained for a disk which does not display uniform degrees of expansion and contraction for different radial directions along the disk surface. In this way, more accurate on-track operation can be ensured.

Furthermore, with the described embodiment, correction values $H_N$ for each of the tracks are obtained by detecting off-track error quantities for the outer peripheral track MOT and inner peripheral track MIT of disk 3, whereby accurately determined correction values $H_N$ are obtained for all of the tracks. However the invention is not limited to such an arrangement. For example, it would be equally possible to also detect off-track error quantities for a plurality of tracks which are positioned between tracks MOT and MIT, and to utilize these off-track error quantities in deriving correction values for the remaining tracks. This would enable even more accurate correction values to be obtained.

In the embodiment of FIG. 3, operation is described as being controlled by separate CPUs 51 and 61. However it will be apparent that in a practical system, the functions of both of these CPUs can be combined in a single system. The CPUs 51 and 61 and the associated ROM 54, drive circuit 62, etc. can thus be collectively defined as computation and control means for controlling the overall operation of the disk drive apparatus and the computation of correction values, and are so defined in the appended claims.

Furthermore, although in the described embodiment the index pulses P1 are derived by an opto-electric system linked to the shaft of the spindle motor which drives the disk, the invention is not limited to such an arrangement. It would be equally possible to employ other means for generating index pulses, such as optical sensing of the position of an index aperture formed in each disk, for example.

Thus, although the present invention has been described in the above with reference to specific embodiments, it should be noted that various changes and modifications to the embodiments may be envisaged, which fall within the scope claimed for the invention as set out in the appended claims. The above specification should therefore be interpreted in a descriptive and not in a limiting sense.

What is claimed is:

1. A disk drive apparatus comprising:
   a read and write head for writing and reading data to and from respective ones of a plurality of concentric track successively formed with a fixed track pitch on a surface of a recording disk, each of said tracks including at least one fixed data portion having predetermined fixed data written therein;
   a spindle motor for rotating said recording disk;
   an access motor coupled to said read and write head for displacing said read and write head radially with respect to said recording disk above said recording disk surface;
   detection means for detecting a level of a read signal produced by said read and write head during read-out of said data written in said at least one fixed data portion, and for producing a detection signal representing said signal level, and;
   computation and control circuit means including memory means, operable to execute a correction data acquisition operation by:
   (a) controlling said access motor to move said read and write head to a first predetermined standard position of a first track of a predetermined pair of said plurality of tracks, said first track of said predetermined pair being positioned close to an outer periphery and a second track of said predetermined pair being positioned close to an inner periphery of said plurality of tracks, and to then radially displace said read and write head relative to said first standard position within a predetermined range of movement, said computation and control means then determining an amount of off-track error of said read and write head with respect to said first standard position of said first track based upon changes in said detection signal occurring during said radial displacement of the read and write head with respect to the first track;
   (b) controlling said access motor to move said read and write head to a second predetermined standard position of a second one of said pair of tracks and to then radially displace said read and write head relative to said second standard position within a predetermined range of movement, said computation and control means then determining an amount of off-track error of said read and write head with respect to said second standard position of said second track based upon changes in said detection signal occurring during said radial displacement of the read and write head with respect to the second track, and;
   (c) storing in said memory means said off-track error amounts for said pair of tracks as respective correction values, and computing and storing in said memory means respective correction values for each of the other ones of said plurality of tracks based upon said off-track error amounts determined for said first and second tracks;

said computation and control circuit means subsequently functioning to correctly position said read and write head in response to an externally supplied request for access to one of said tracks, by reading out from said memory means the one of said correction values corresponding to the requested track and then controlling said access motor to move said read and write head to a position which is radially displaced from the standard position of the requested track in a direction and by an amount which are in accordance with said corresponding correction value.

2. A disk drive apparatus according to claim 1, in which said access motor is a stepping motor operable both in a stepping mode of operation in which said read and write head is moved by radial step displacements, with said track pitch being an integral multiple of one of said step displacements, and in a microstepping mode of operation in which said read and write head is moved by radial microstep displacements each of amplitude substantially smaller than said track pitch.

3. A disk drive apparatus according to claim 2, in which said radial displacement of said read and write head relative to one of the first or second standard positions during said correction data acquisition operation is executed as a fixed number of successive ones of said microstep displacements from the standard position of said one of the first or second tracks in one direction, followed by a fixed number of microstep displacements from said standard position of said one of the first or second tracks in the opposite direction.

4. A disk drive apparatus according to claim 3, in which said computation and control means executes said read and write head positioning in response to said request for access to a track by first controlling said access motor to move said read and write head to a standard position of said requested track by operation in said stepping mode, said computation and control means then reading out from said memory means the one of said correction values corresponding to said requested track and controlling said access motor to operate in said microstepping mode to move said read and write head from said standard position of said requested track by a number of said microstep displacements and in a radial direction which are respectively in accordance with said correction value.

5. A disk drive apparatus according to claim 2, in which said access motor is a two-phase stepping motor, and in which operation in said microstepping mode is executed by fixing a level of a first current phase supplied to said motor at a constant value while decrementing the level of a second current phase supplied to said motor in successive steps, with said steps successively varying in amplitude in accordance with a tangent characteristic.

6. A disk drive apparatus according to claim 1, in which said request for access to a track is issued as a signal supplied from a host computer, said data read from said disk being supplied to said host computer, and in which said host computer responds to an occurrence of errors in data which is read out from a track, while said read and write head is positioned relative to said track in accordance with the corresponding one of said stored correction values, by issuing an error indication signal to said disk drive apparatus, said computation and control means responding to said error indication signal by:

controlling said access motor to radially displace said read and write head relative to the standard position of the one of said tracks from which said data errors were read, within said predetermined range of movement, said computation and control means then determining an amount of off-track error of said track based upon changes in said detection signal occurring during said displacement;

storing said off-track error amount in said memory means as an updated correction value to replace said corresponding stored correction value, and;

reading out from said memory means said updated correction value and controlling said access motor to move said read and write head to a position which is radially displaced from the standard position of said track by an amount and in a direction which are respectively in accordance with said updated correction value.

7. A disk drive apparatus according to claim 1, in which said detection means comprise:

index pulse generating means for producing index pulses in synchronism with times during which said data of said gap portions of a track is being read by said read and write head and a corresponding read signal produced thereby;

sample-and-hold circuit means for sampling and holding an amplitude of pulses in said read signal at timings determined by said index pulses, and;

analog-digital conversion means for converting an analog output signal from said sample-and-hold circuit means to a digital signal representing said pulse amplitude, said digital signal constituting said detection signal.

8. A disk drive apparatus according to claim 1, and further comprising insertion sensing means responsive to insertion of a recording disk into said disk drive apparatus for producing an output signal, and in which said computation and control means is responsive to said insertion means output signal for initiating said correction data acquisition operation.

9. A disk drive apparatus according to claim 1, and further comprising temperature sensing means for producing an output signal in response to a change in temperature within said disk drive apparatus which exceeds a predetermined amount, and which said computation and control means is responsive to said temperature sensing means output signal for initiating said correction data acquisition operation.

10. A disk drive apparatus according to claim 1, and further comprising humidity sensing means for producing an output signal in response to a change in humidity within said disk drive apparatus which exceeds a predetermined amount, and in which said computation and control means is responsive to said humidity sensing means output signal for initiating said correction data acquisition operation.

11. A disk drive apparatus according to claim 1, and further comprising timer means for producing an output signal each time a predetermined time interval has elapsed, and in which said computation and control means is responsive to said timer means output signal for initiating said correction data acquisition operation.

12. A disk drive apparatus for reading data from a plurality of concentric tracks of a recording disk and for supplying said data to a host computer, said host computer functioning to detect the presence of errors in said data and to supply to said disk drive apparatus an error indication signal indicative of such errors, each of said tracks including a gap fixed data portion having fixed data written therein, said disk drive apparatus comprising:

a read and write head for read-out of said data from said tracks;

means for rotating said disk;

means for positioning said read and write head with respect to said tracks along a radius of said disk;

detection means for detecting a level of a read signal produced from said read and write head during read-out of said fixed data from said fixed data portion of a track and for producing a corresponding detection signal, and;

computation and control means including memory means, operable to execute a correction data acquisition operation by detecting an amount of off-track error of said read and write head with respect to at least one of said tracks based upon said detection signal, computing respective correction values for the remainder of said tracks based on said detected off-track error amount, and storing in said memory means said correction values;

said computation and control means further functioning to control said read and write head positioning means prior to read-out of data from one of said tracks such as to accurately position said read and write head with respect to said track based upon a corresponding one of said stored correction values, and further functioning, in the event that said error indication signal is produced from said host computer during subsequent read-out of data from said track following said accurate positioning, to execute a single track correction data acquisition operation for said track and to store as an updated correction value for said track an off-track error which is derived by said single track correction data acquisition operation, and to control said read and write head positioning means to accurately position said read and write head in accordance with said updated correction value.

* * * * *